(12) United States Patent
Blanco et al.

(10) Patent No.: US 11,696,346 B2
(45) Date of Patent: Jul. 4, 2023

(54) METHOD FOR RADIO COMMUNICATION OF A SLAVE DEVICE WITH A MASTER DEVICE

(71) Applicant: Idemia Identity & Security France, Courbevoie (FR)

(72) Inventors: Fabien Blanco, Courbevoie (FR); Jean-Yves Bernard, Courbevoie (FR); Marek Kociecki, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 244 days.

(21) Appl. No.: 17/067,155

(22) Filed: Oct. 9, 2020

(65) Prior Publication Data

US 2021/0136841 A1 May 6, 2021

(30) Foreign Application Priority Data

Nov. 6, 2019 (FR) ...................................... 1912438

(51) Int. Cl.
*H04L 9/40* (2022.01)
*H04B 5/00* (2006.01)
*H04W 76/10* (2018.01)
*H04W 4/80* (2018.01)
*H04W 72/0453* (2023.01)

(52) U.S. Cl.
CPC ............. *H04W 76/10* (2018.02); *H04W 4/80* (2018.02); *H04W 72/0453* (2013.01)

(58) Field of Classification Search
CPC ... H04W 76/10; H04W 4/80; H04W 72/0453; H04W 84/20; H04W 12/122; H04B 17/309; H04B 5/0031; H04L 63/14; H04L 63/1408; H04L 63/1441
See application file for complete search history.

(56) References Cited

U.S. PATENT DOCUMENTS

| 2013/0003803 | A1* | 1/2013 | Ferguson | .......... H04W 74/0808 |
| | | | | 455/67.14 |
| 2015/0022016 | A1* | 1/2015 | Kim | ........................ H02J 50/70 |
| | | | | 307/104 |
| 2019/0236962 | A1 | 8/2019 | Tholen et al. | |
| 2021/0344235 | A1* | 11/2021 | Youn | ........................ H02J 50/40 |

FOREIGN PATENT DOCUMENTS

CN           108449114 A           8/2018

* cited by examiner

*Primary Examiner* — Joseph E Dean, Jr.
(74) *Attorney, Agent, or Firm* — Womble Bond Dickinson (US) LLP

(57) ABSTRACT

A method of radio communication of a slave device with a master device, the method comprising steps of:
receiving (202) by the slave device of a connection request sent by the master device comprising first communication parameters for communicating with the master device, the communication parameters being indicative of a sequence of frequency channels to be used during successive periods to communicate with the master device,
during one of the periods, implementing by the slave device of a processing capable of causing the master device to send a connection update comprising second parameters for communicating with the master device to be used in place of the first communication parameters, the processing comprising an action (210) on one of the frequency channels capable of causing the master device to detect a degradation in communication quality on the frequency channel.

14 Claims, 2 Drawing Sheets

[Fig. 1]
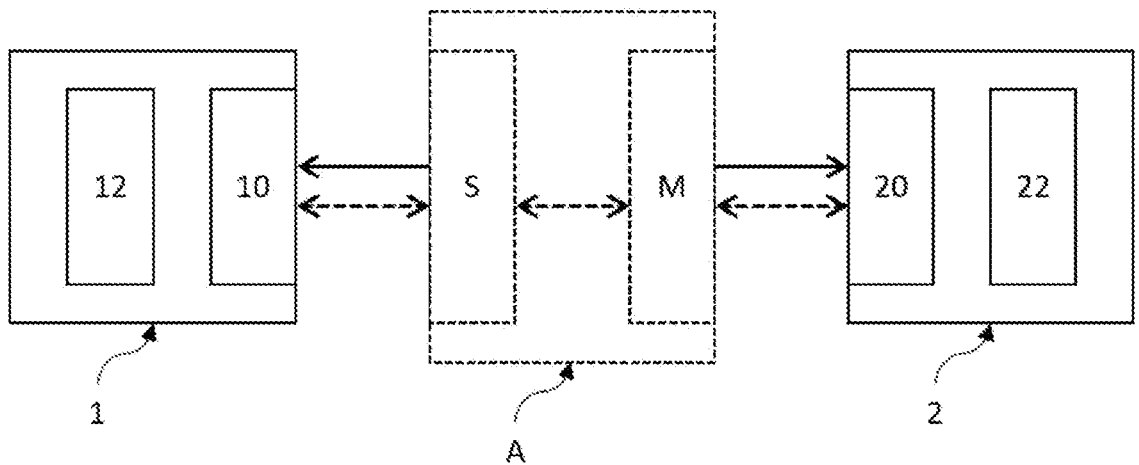
[Fig. 2]
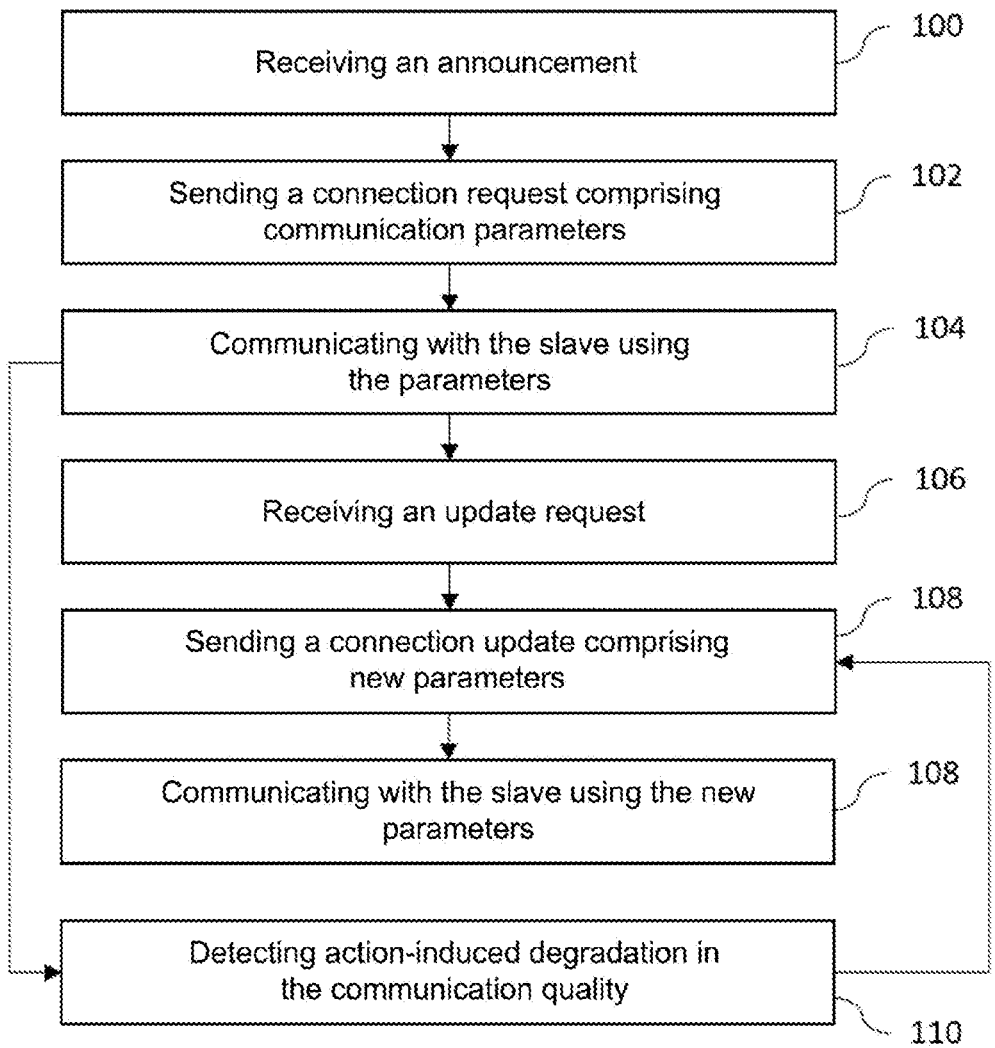

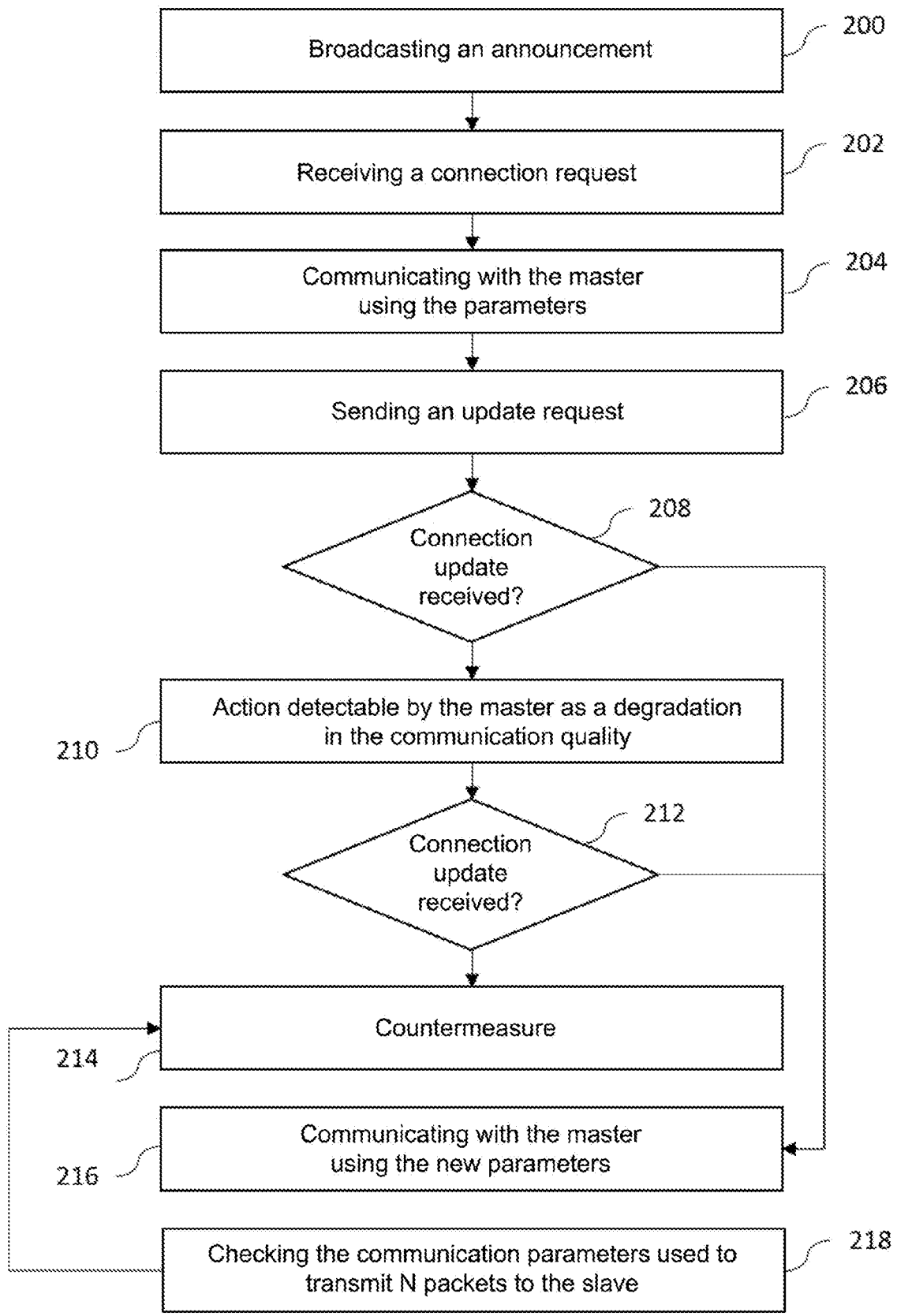
[Fig. 3]

METHOD FOR RADIO COMMUNICATION OF A SLAVE DEVICE WITH A MASTER DEVICE

TECHNICAL FIELD OF THE INVENTION

This invention relates to a method of radio communication of a slave device with a master device, as well as a slave device adapted to implement such a method.

The invention has an advantageous application in radio communications using a Bluetooth Low Energy (BLE) protocol.

STATE OF THE ART

The BLE protocol controls master to slave radio communications. Such radio communications use a plurality of frequency channels.

In particular, the BLE protocol uses a channel hopping mechanism. Through such a mechanism, two devices communicating with each other regularly and synchronously change frequency channel to exchange these data with each other.

To do this, one of the two devices present, referred to as the master, transmits to the other device, referred to as the slave, a connection request comprising communication parameters that the slave device is supposed to use to communicate with the master. The communication parameters indicate a sequence of frequency channels to be used during successive periods to communicate with the master device. The slave thus knows which frequency channel to switch to, and when, to exchange data with the master. Such communications are susceptible to relay attack. During such an attack, a third party system acts as a relay between the master and the slave. This third party system thus simulates being the slave to the master, and also simulates being the master to the slave.

OVERVIEW OF THE INVENTION

One aim is to protect radio communications using channel hopping more effectively against relay attacks.

To this end, according to a first aspect, a method is proposed for radio communication of a slave device with a master device, the method comprising steps of:
- receiving by the slave device of a connection request sent by the master device comprising first communication parameters for communicating with the master device, the communication parameters being indicative of a sequence of frequency channels to be used during successive periods to communicate with the master device,
- during one of the periods, implementing by the slave device of a processing suitable for causing the master device to send a connection update comprising second parameters for communicating with the master device to be used in place of the first communication parameters, the processing comprising an action on one of the frequency channels suitable for causing the master device to detect a degradation in communication quality on the frequency channel.

The method according to this first aspect may further comprise the following optional features, taken alone or in combination, whenever this is technically possible. Preferably, the processing comprises sending a connection update request, to the master device, the action being selectively implemented when the slave device detects that the parameter update request has not been processed by the master device.

Preferably, the update request is encrypted by the slave device before being sent. Preferably, the action on one of the frequency channels comprises the sending, on the frequency channel, of a message comprising a distorted content simulating a transmission error, such as a message comprising payload data and a cyclic redundancy code with a value indicating an error in the payload data.

Preferably, the action on one of the frequency channels comprises not sending a response expected by the master device on the frequency channel.

Preferably, the frequency channel on which the action is performed is randomly selected by the slave device from among several frequency channels.

Preferably, the method comprises a countermeasure step when the slave device does not receive the frequency connection update within a predetermined time or after receiving a predetermined number of packets sent by the master device, the countermeasure step comprising at least one of the following operations:
- sending a connection interruption message to the master device,
- sending an alert message informing the master device that the radio communication is not secure against relay attacks,
- shutting down radio communication with the master device.

Preferably, the method further comprises the following steps:
- after receiving the connection update, receiving by the slave device of N consecutive packets from the master device, wherein N≥1,
- comparing the communication parameters used for the transmission of the N consecutive packets to the slave device against the second communication parameters,
- when the compared parameters do not match, implementing by the slave device a countermeasure step comprising at least one of the following operations:
- sending a connection interruption message to the master device,
- sending an alert message informing the master device that the radio communication is not secure against relay attacks,
- shutting down radio communication with the master device.

Preferably, the slave device uses a low-power Bluetooth protocol to communicate with the master device.

According to a second aspect, a computer program product is also proposed, comprising program code instructions for executing the steps of the method according to the first aspect, when this program is executed by a slave device.

According to a third aspect, a computer-readable memory storing instructions executable by the computer for the execution of the steps of the method according to the first aspect is also proposed.

According to a fourth aspect, a slave device is also proposed, comprising:
- a radio communication interface for receiving a connection request sent by a master device comprising first communication parameters for communicating with the master device, the communication parameters being indicative of a sequence of frequency channels to be used during successive periods to communicate with the master device, a processing unit configured to implement, during one of the periods, a processing suitable for causing the master device to send a connection update comprising second communication parameters with the master device to be used in place of the first communication parameters, the processing comprising an action on one of the frequency channels suitable for causing the master device to detect a degradation in communication quality on the frequency channel.

According to a fifth aspect, a system is also proposed, comprising a slave device according to the fourth aspect, and a master device configured to send the connection update.

DESCRIPTION OF THE FIGURES

Other characteristics, purposes and advantages of the invention will become clear from the following description, which is purely illustrative and non-limiting, and which must be read in the context of the attached drawings in which:

FIG. 1 schematically depicts a master device and a slave device according to one embodiment, as well as an attacker performing a relay attack.

FIG. 2 is a flowchart of steps of a method according to one embodiment, implemented by a master device.

FIG. 3 is a flowchart of steps of a method according to one embodiment, implemented by a slave device.

In the set of figures, similar elements are marked with identical references.

DETAILED DESCRIPTION OF THE INVENTION

A system comprising a master device 1 and a slave device 2 for communicating with each other by radio is shown in FIG. 1. For the sake of brevity, devices 1 and 2 will be hereinafter referred to simply as master 1 and slave 2.

The master 1 comprises a communication interface 10 for radio communication with the slave 2. The interface typically comprises at least one radio antenna. The interface can use different frequency channels to communicate with the slave 2.

The master 1 furthermore comprises a processing unit 12, which is in particular configured to generate data that can be sent by communication interface 10, to control the operation of the communication interface, and to process data received by communication interface 12. The Processing unit 12 typically comprises one or more processors, microprocessors, programmable or non-programmable circuitry (ASIC, FPGA, etc.).

Similarly, the slave 2 comprises a communication interface 20 for radio communication with the master 2. Communication interface 20 is of the same type as communication interface 10.

The slave 2 furthermore comprises a processing unit 22, which is in particular configured to generate data that can be sent by communication interface 22, to control the operation of communication interface 20, and to process the data received by communication interface 22.

The master 1 and the slave 2 can communicate with one another via different frequency channels. Each frequency channel is associated with its own central frequency.

For example, in the case where the master 1 and the slave 2 use a Bluetooth Low Energy (BLE) protocol to communicate with each other, the number of frequency channels is 40. FIG. 1 also shows a device A capable of implementing a relay attack affecting a communication between the master 1 and the slave 2. Device A will hereinafter be referred to more simply as "relay".

Relay A comprises a slave module S adapted to simulate being slave 2 to master 1, and a master module M adapted to simulate being master 1 to slave 1. The slave module S and the master module M are connected together by any type of connection. This connection is, for example, via a network such as the Internet, in which case relay A is, in fact, a distributed system.

Referring to FIGS. 2 and 3, a method for communication between the master 1 and the slave 2 comprises the following steps.

Slave 2 broadcasts an announcement (step 100). An announcement is not a message specifically intended for the master 1, but a message with the purpose of signaling the presence of the slave 2 to any nearby master.

Slave 2, for example, sends an announcement every 500 milliseconds.

An announcement is transmitted by the slave 2 via announcement frequency channels which are reserved for broadcasting announcements. For example, the BLE protocol provides for 3 announcement frequency channels out of a total of 40 frequency channels. The master 1 receives an announcement sent from the slave 2 (step 200).

In response to this announcement, the master 1 sends a connection request to the slave 2 (step 202). The connection message allows to indicate to the slave 2 that the master 1 wishes to exchange data with the slave 2.

The connection request comprises communication parameters indicative of a sequence of frequency channels to be used during successive periods to communicate with the master 1.

The frequency channel sequence can be defined for example by the following law:

$$f_{(n+1)} = (f_n + hop) \bmod K \quad [\text{Math 1}]$$

where $f_n$ is a frequency to be used during a period of index n, $f_{n+1}$ is a period to be used during a period of index n+1, hop is a parameter which can take several values, for example in the range from 5 to 16, mod denotes the modulo operation, and K is a number of frequency channels usable for transporting payload data, as opposed to the channels reserved for announcements. For example, K=37 in the case of the BLE protocol.

Thus, the connection request comprises for example the value chosen for the hop parameter and a length of time to wait before using the first frequency of the sequence.

The connection request can also comprise a duration of a period to be used (in the case where the periods are of identical durations). Alternatively, this duration is known in advance by the master 1 and the slave 2.

The frequency channel sequence can alternatively be defined by a more complex law and/or more complex parameters. For example, the channel sequence can be defined using the algorithm used in the BLE 5.0 protocol, which is more difficult to invert since it remaps unused channels onto used channels, initially giving a less linear result a priori. See https://fr.mathworks.com/help/comm/examples/ble-channel-selection-algorithms.html.

The connection request is sent in clear text.

The connection request is referred to as connection request in the BLE protocol.

The slave 2 receives the connection request (step 202). For the slave 2 to process the connection request positively (which is assumed in the following), said connection request must be received by the slave within a predetermined length of time since the last announcement was sent. In the BLE protocol, this delay is 150 microseconds, with an error margin of the order of about ten microseconds.

Once the connection request is received and processed by the slave 2, the master 1 and the slave are synchronized on the same sequence of frequency channels, and jointly use this sequence to communicate with each other (steps 104, 204). This communication 104, 204 comprises the following sub-steps:

During a first period, the master 1 sends a data packet (Packet Data Unit, PDU) in the first frequency channel of the sequence indicated in the connection request it has previously sent to the slave 2. The slave 1 has been configured to receive data on the same first frequency channel during this first period; it therefore receives the sent data packet. As a response, the slave 2 sends a response packet on the same first frequency channel to acknowledge receipt of the data packet from the master 1. If the master 1 receives this response within a predetermined time, e.g. 150 microseconds, the master 1 considers the transmission of the data packet to have been carried out correctly.

During a second period after the first period, the master 1 and the slave 2 repeat the above steps after "hopping" to the second frequency channel of the sequence, and so on.

After the slave 2 has received the connection request during step 102, communication between the master 1 and the slave 2 can switch to a secure mode. In this secure mode, the master 1 and the slave 2 are able to exchange encrypted messages such that only the recipient of the message can decrypt. Steps 104, 204 use this secure mode.

Such a switch to a secure mode typically occurs after a pairing between the master 1 and the slave 2, as known to the skilled person.

The slave 1 implements a process that is able to cause the master 1 to send a connection update indicating a new frequency channel sequence to be used, which is therefore different from the one used up to that moment jointly by the master 1 and the slave 2.

This processing is implemented once the communication between the master 1 and the slave 2 is in the secure communication mode (when this secure mode is used).

The processing first comprises the slave 2 sending a connection update request to the master 1 (step 206). This update request is sent via the frequency channel to be used at the current time, indicated by the connection request sequence received by the slave 2 in step 202.

The update request is encrypted, such that only the master 1 is able to decrypt the connection update sent in step 206.

In the BLE protocol, such an update request is referred to as connection parameter update request.

The slave 2 also waits for a connection update in response to the update request sent in step 206.

In the absence of a relay attack, the master 1 receives the update request sent by the slave 2 (step 106). The master 1 then sends a connection update in response to receiving the update request, the connection update indicating or being accompanied by at least one new parameter for defining a new sequence of frequency channels to be subsequently used by the slave 2 (step 108). It is specified here that the new parameters may be fewer in number than those used to fully define a sequence of frequency channels in the connection request. Indeed, a modified parameter is sufficient to define a new sequence, this parameter being capable, for example, of modifying the sequence timings. The connection update is encrypted by the master 1, such that only the slave 2 is able to decrypt the connection update sent in step 108.

However, attacker A performing a relay attack can intercept the connection update request sent by the slave 2, and make the master 1 not process this request, thus preventing the connection update expected by the slave 2 from being sent.

The slave 2 checks whether it is receiving a connection update (step 208), typically within a predetermined time period.

When the slave 2 detects that the master 1 has not processed the update request, finding that it has not received such a connection update within the predetermined time period, the slave 2 implements an action on one of the frequency channels (step 210), this action being capable of causing the master 1 to detect a degradation in the communication quality on the frequency channel.

It should be noted that the degradation in the communication quality of a frequency channel is not caused here by the transmission medium between the slave 2 and the master 1, but simulated by action 210 carried out by the slave 2, so as to make the master 1 believe that such a degradation exists, and then force the master 1 to send a connection update.

Action 210 performed by the slave 2 may affect the current frequency channel, i.e. the frequency channel supposed to be used by the slave 2 to communicate with the master at the moment when the slave detects that it has not received a connection update normally, this current frequency channel being part of the channel sequence initially indicated in the connection request provided by the master 1.

However, it is advantageous for the slave to randomly select the frequency channel on which the above-mentioned action will be performed. The frequency channel can thus be a frequency channel associated with a period of time after the moment of detection of non-receipt of a connection update. In this case, the slave waits for this subsequent period of time to perform action 210.

To make the master 1 believe that such a degradation in the communication quality has occurred on one of the communication channels, the slave 2 can perform different types of action.

The slave 2 can send, on the selected frequency channel, a message comprising deliberately distorted content to simulate a transmission error between the slave 2 and the master 1. For example, this distorted message comprises payload data and a cyclic redundancy code (CRC) with a value indicating an error in the payload data. In order to generate such a distorted message, the slave 2 can first generate a correct message with coherent payload data and CRC, and then change the value of some bits of the message so as to distort it.

This message with distorted content is encrypted by the slave 2, such that only the master 1 can decrypt it.

The master 1 detects a degradation in communication quality on the selected frequency channel by noticing the inconsistency between the payload data and the CRC it receives from the slave 1 through this channel.

Alternatively, the slave 2 can refrain from sending a response however expected by the master device on the selected frequency channel. For example, the slave refrains from acknowledging receipt of a PDU data message sent by the master 1 on the selected frequency channel. In this variant, the master infers, from not receiving such an acknowledgment of receipt within a predetermined period of time, that a degradation in the communication quality has occurred on the selected frequency channel.

Regardless of the type of action implemented by the slave 2, the master 1 concludes that the communication quality on the current frequency channel has become degraded on one of the frequency channels (step 110). The master 1 then sends a connection update containing a new sequence of frequency channels to be used by the slave 2 (step 108 discussed above).

The slave 2 checks whether it is receiving a connection update (step 212), after triggering action 210.

If for any reason the slave 2 is still not receiving a connection update despite action 210 being performed, for example within a predetermined period of time after action 210, or after receiving a predetermined number of packets sent by the master device since action 210, the slave 2 implements a countermeasure step 214 as a last resort.

This countermeasure step 214 may comprise one of the following operations:
- the slave 2 sending a connection interruption message to the master device 1,
- the slave 2 sending an alert message informing the master device 1 that the radio communication is not secure against relay attacks,
- completely shutting down radio communication with the master device 1.

The slave 2 can also return to an announcement mode, wherein it repeats the announcement broadcasting step 200 described above.

In the embodiments of the method described above, action 210, which allows triggering the use of a new frequency channel sequence, is initiated on the slave 2 side. An advantage of this solution is that it is not necessarily required to modify the operation of a master 1 already configured to send a connection update in the event of quality degradation on a frequency channel used.

The case where the slave 2 receives a connection update from the master 1 in step 208 or 212 will now be considered. Receipt of this update does not in and of itself guarantee the absence of relay A between the master 1 and the slave 2. Typically, this relay A may have transferred this connection update to the slave 1 without changing its content.

To evaluate the risk of the presence of relay A, the slave 2 advantageously implements the following steps.

After receiving the connection update in step 208 or 212, the slave device receives N consecutive packets from the master device, where N≥1. These N packets are preferably those received by the slave immediately after the connection update provided by the master 1.

These N packets are received by the slave in accordance with communication parameters: each packet is actually received at a given moment, via a given frequency channel.

The slave compares the communication parameters used for the transmission of the N consecutive packets to the slave with the communication parameters indicated in the connection update.

When the compared parameters match, the slave concludes that the packets were received under normal conditions. The risk of presence of a relay such as A is then considered to be low by slave 2.

On the other hand, when the compared parameters do not match, the slave 2 advantageously implements countermeasure step 214.

In fact, when a relay A is present, it may take some time for it to become aware of the new frequency channel sequence indicated in the connection update. In particular, relay A may not have the time or not have the ability to access the contents of the connection update it is relaying, but rather to detect the N frequency channels used by the master to transmit the N consecutive packets, and predict, on the basis thereof, the more global sequence of channels indicated in the connection update sent by the master. This detection process therefore takes a certain amount of time, during which the relay A is still using the obsolete frequency channels that had previously been indicated in the connection request (by virtue of which, hitherto, this relay managed to simulate being the master 1 to the slave 2). Therefore, in this period of time, the communication parameters used by relay A to relay the N packets to the slave 2 do not yet match the communication parameters indicated in the connection update received by the slave 2. Thus, when the parameters compared by the slave 2 do not match, there is a risk that a relay attack is in progress, and therefore it is advantageous to trigger the countermeasure step in this situation.

The devices and methods described above are advantageously applied in communications using the BLE protocol, but are not limited to this particular application. These devices and methods can be used with other protocols that establish a master-slave relationship between two devices.

The invention claimed is:

1. A method of radio communication of a slave device with a master device, the method being carried out by the slave device and comprising:
   receiving a connection request sent by the master device comprising first communication parameters for communicating with the master device, the communication parameters being indicative of a sequence of frequency channels to be used during successive periods to communicate with the master device;
   communicating with the master device using the first communication parameters,
   during one of the periods, implementing a processing causing the master device to send a connection update comprising second communication parameters, the processing comprising an action on one of the frequency channels causing the master device to detect a degradation in communication quality on the frequency channel;
   receiving the connection update; and
   communicating with the master device using the second communication parameters in place of the first communication parameters.

2. The method according to claim 1, wherein the processing comprises sending a connection update request to the master device, the action being selectively implemented when the slave device detects that the parameter update request has not been processed by the master device.

3. The method according to claim 1, wherein the connection update request is encrypted by the slave device before being sent.

4. The method according to claim 1, wherein the action on one of the frequency channels comprises the sending on the frequency channel of a message comprising a distorted content simulating a transmission error, such as a message comprising payload data and a cyclic redundancy code with a value indicating an error in the payload data.

5. The method according to claim 1, wherein the action on one of the frequency channels comprises not sending a response expected by the master device on the frequency channel.

6. The method according to claim 1, wherein the frequency channel on which the action is performed is randomly selected by the slave device from among several frequency channels.

7. The method according to claim 1, further comprising a countermeasure step when the slave device does not receive the frequency connection update within a predetermined time or after receiving a predetermined number of packets sent by the master device, the countermeasure step comprising at least one of the following operations:
- sending a connection interruption message to the master device,
- sending an alert message informing the master device that the radio communication is not secure against relay attacks,
- shutting down radio communication with the master device.

8. The method according to claim 1, comprising:
- after receiving the connection update, receiving by the slave device of N consecutive packets from the master device, where N≥1,
- comparing the communication parameters used for the transmission of the N consecutive packets to the slave device against the second communication parameters,
- when the compared parameters do not match, implementing by the slave device of a countermeasure step comprising at least one of the following operations:
- sending a connection interruption message to the master device,
- sending an alert message informing the master device that the radio communication is not secure against relay attacks,
- shutting down radio communication with the master device.

9. The method according to claim 1, wherein the slave device uses a low-power Bluetooth protocol to communicate with the master device.

10. A computer program product comprising program code instructions for executing the steps of the method according to claim 1, when said program is executed by a master or slave device.

11. A non-transitory computer-readable memory storing instructions executable by the computer for the execution of the steps of the method according to claim 1.

12. The method of claim 1, wherein the connection update is transmitted by the master device to the slave device in at least one of the frequency channels.

13. A slave device (2) comprising:
a radio communication interface for:
- receiving a connection request sent by a master device and comprising first communication parameters for communicating with the master device, the communication parameters being indicative of a sequence of frequency channels to be used during successive periods to communicate with the master device,
- communicating with the master device using the first communication parameters;
- receiving a connection update sent by the master device, wherein the connection update comprises second communication parameters,
- communicating with the master device using the second communication parameters in place of the first communication parameters, a processing unit configured to implement, during one of the periods, a processing capable of causing the master device to send the connection update, the processing comprising an action on one of the frequency channels capable of causing the master device to detect a degradation in communication quality on the frequency channel.

14. A system comprising:
a slave device according to the preceding claim 13, and
a master device configured to send the connection update.

* * * * *